(12) United States Patent
Nylander et al.

(10) Patent No.: US 8,879,406 B2
(45) Date of Patent: Nov. 4, 2014

(54) USER EQUIPMENT TRACING IN A WIRELESS COMMUNICATIONS NETWORK

(75) Inventors: Tomas Nylander, Värmdö (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 265 days.

(21) Appl. No.: 12/600,849

(22) PCT Filed: May 28, 2007

(86) PCT No.: PCT/SE2007/050365
§ 371 (c)(1),
(2), (4) Date: Nov. 19, 2009

(87) PCT Pub. No.: WO2008/147262
PCT Pub. Date: Dec. 4, 2008

(65) Prior Publication Data
US 2010/0165862 A1    Jul. 1, 2010

(51) Int. Cl.
| | |
|---|---|
| G01R 31/08 | (2006.01) |
| H04L 12/24 | (2006.01) |
| H04W 24/08 | (2009.01) |
| H04W 84/04 | (2009.01) |
| H04W 80/04 | (2009.01) |
| H04W 60/00 | (2009.01) |

(52) U.S. Cl.
CPC ............ *H04L 41/12* (2013.01); *H04W 84/045* (2013.01); *H04W 24/08* (2013.01); *H04W 80/04* (2013.01); *H04W 60/00* (2013.01)
USPC ........ 370/252; 370/241; 370/313; 455/456.1; 455/414.1; 709/223

(58) Field of Classification Search
None
See application file for complete search history.

(56) References Cited

U.S. PATENT DOCUMENTS

| | | | |
|---|---|---|---|
| 7,453,814 B2* | 11/2008 | Jang | 370/241 |
| 7,590,418 B1* | 9/2009 | Thomson | 455/433 |
| 7,808,936 B2* | 10/2010 | Smith et al. | 370/286 |

(Continued)

FOREIGN PATENT DOCUMENTS

| | | |
|---|---|---|
| EP | 1814343 A1 | 8/2007 |
| WO | WO 2004/040938 A1 | 5/2004 |
| WO | WO 2007/015068 A1 | 2/2007 |

*Primary Examiner* — Kibrom T Hailu (57) ABSTRACT

The present invention relates to a method and a network control node for tracing activity and monitoring performance of user equipments in a partly IP-based wireless communications network. The wireless communications network comprises operator controllable and/or operator uncontrollable wireless access points in communication with a network control node via one or more operator controllable and/or operator uncontrollable Internet Protocol, IP, networks. The described method is characterized by a first step of receiving a trace triggering request and user equipment identification, at a network control node, from a first network node. Alternatively, the trace triggering request is received on a signaling connection that explicitly identifies the user equipment. The network control node then starts a trace recording and information retrieval procedure relating to the identified user equipment and identifies all used IP networks and user equipment serving access point. The method further comprises the steps of analyzing the IP networks used between the network node and the user equipment and/or analyzing the user equipment serving access point. Thereafter, a trace printout is created including analyzing results and retrieved information, the printout is to be sent to a second network node, or stored locally for later retrieval.

16 Claims, 3 Drawing Sheets

(56) References Cited

U.S. PATENT DOCUMENTS

| | | | |
|---|---|---|---|
| 7,916,701 B1 * | 3/2011 | Viswanath et al. | 370/338 |
| 2004/0132465 A1 * | 7/2004 | Mattila et al. | 455/456.1 |
| 2006/0068712 A1 | 3/2006 | Kroboth et al. | |
| 2006/0217154 A1 | 9/2006 | Fauconnier et al. | |
| 2007/0081493 A1 | 4/2007 | Rune et al. | |
| 2007/0097939 A1 | 5/2007 | Nylander et al. | |
| 2007/0099561 A1 | 5/2007 | Voss et al. | |
| 2008/0085722 A1 * | 4/2008 | Hirano et al. | 455/452.1 |
| 2008/0101301 A1 * | 5/2008 | Thomas et al. | 370/335 |
| 2008/0165702 A1 | 7/2008 | Bienas et al. | |
| 2009/0003227 A1 | 1/2009 | Malomsoky et al. | |

* cited by examiner

USER EQUIPMENT TRACING IN A WIRELESS COMMUNICATIONS NETWORK

TECHNICAL FIELD

The present invention relates to a method and a network control node for tracing activity and monitoring performance of user equipments in a partly IP-based Wireless communications network.

BACKGROUND

Tracing of User Equipment (UE), even called Mobile Station (MS), is a procedure known and can be initiated in a Public Land Mobile Network (PLMN), which is for example initiated from the Core Network (CN), either from a Home Location Register (HLR) or directly in a Mobile Switching Centre (MSC) or in a Visitor Location Register (VLR) or in a combined MSC/VLR. The initiation is performed by triggering a 'trace invocation' message in a network node for an active UE. Other possibility is to set a specific flag or indication in a database of UEs for idle UEs at one point in time. This flag or indication can be read at a second point in time when the UE is entering active state and will also result in triggering a "trace invocation" message in a network node. For example, a Radio Access Network Application Part (RANAP) protocol can be used for transferring a "Trace Invoke" message between the Core Network (CN), which can be a MSC or a Serving GPRS Support Node (SGSN), and a Radio Network Controller (RNC). RANAP signaling protocol resides in a control plane of Radio network layer of Iu interface in the Universal Mobile Telecommunication System (UMTS) protocol stack. Iu interface is the interface between the RNC and the CN and is defined in the 3GPP Technical Specification (TS) 25.410 and the 3GPP TSs referenced from that specification. A Radio Network Controller (RNC) receiving a "Trace Invoke" message performs local printout about all available information related to the indicated UE as a response. Relevant information can also be sent to an Operation and Maintenance Centre (OMC) if so indicated in the trace invocation request. The information could consists of e.g. the International Mobile Subscriber Identity (IMSI), a 'trace reference number/identification' in order for the printout to be associated with the correct trace order, the cell currently used, target cell for handover cases, various events and messages such as assignment, handover etc. Trace is used to gather information on a UE and to report the information to a collection entity for further analysis of the data. A call trace may be initiated in the RNC, in Node B or in a Radio Base Station (RBS). Tracing is described in a number of 3GPP specifications for example in 3GPP TS 32.421 V7.2.0 (2006-09) and 3GPP TS 32.432 V7.0.0 (2005-09).

An investigation is being performed, at the moment of this application, to find a possible ways to provide homes or small areas with 3G coverage for a limited number of users using a small Radio base Station (RBS). This kind of small are a radio base stations are called Home 3G Access Points (H3GAPs), Home Access Points (HAPs), Home Node Bs (HNBs) or Femto RBSs. The term Femto RBS is used in this application and is mainly targeted for private homes and small office segments and one benefit is that there is no need for alternative access technology investments or WLAN/UMA/GAN in handsets, since any existing 3G phones will work in such an environment. Examples of given 3G standards to be used are Wideband Code Division Code Multiple Access (WCDMA), CDMA2000 and Time Division-Synchronous Code Division Multiple Access (TD-SCDMA).

The Femto RBS concept is mostly relevant for a scenario using WCDMA, but it could also be applied in other cases and technologies. For example, a similar solution might be developed for 2G technologies e.g. GSM and might also be developed for LTE (Long Term Evolution), CDMA2000 or TD-SCDMA.

The Femto RBS provides normal WCDMA coverage for end users and is connected to a Radio Network Controller (RNC) using some kind of IP based transmission. A coverage area provided is called a Femto cell to indicate that the coverage area is relatively small compared with an area of a Macro cell. One alternative for the IP based transmission is to use Fixed Broadband access (like xDSL, Cable etc.) to connect the Femto RBSs to the RNC. Another alternative would be to use Mobile Broadband access e.g. HSDPA and Enhanced Uplink or some WiMAX technologies.

Figure 1:
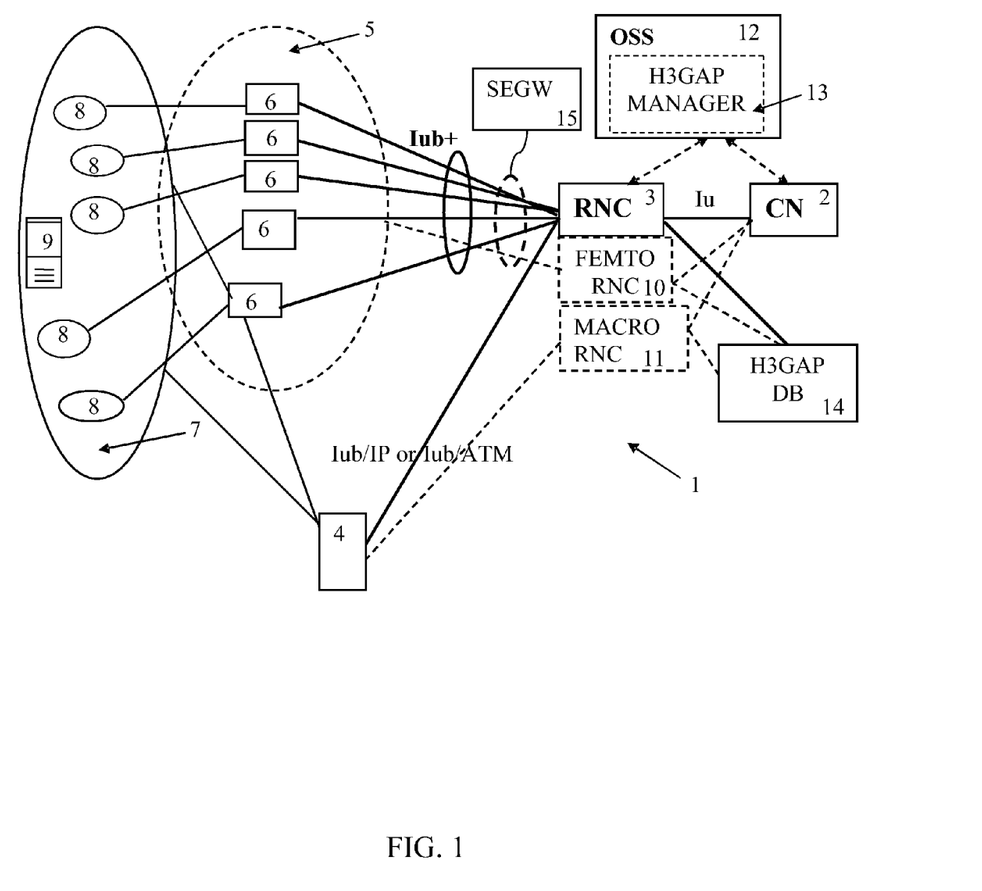
FIG. 1 is a block diagram illustrating a wireless communications network including Femto RBSs used as access point for user equipments located in Femto cells.

FIG. 1 is a block diagram illustrating a WCDMA network including Femto RBSs working as Home 3G Access Points. The wireless communications network 1 includes a Core Network (CN) 2 connected to a Radio Network Controller, RNC 3, using a standard Iu interface. Alternatively, the RNC is a Macro RNC 11 and/or a Femto RNC 10. The RNC controls all Radio Base Stations that are connected to the RNC, e.g. Macro RBSs and Femto Radio Base Stations. Other types of RBSs like Micro RBSs and Pico RBSs are also controlled by the RNC (not shown). In the figure, the RNC 3 is connected to a Macro RBS 4 and to one 6 or more Femto RBSs 5. The interface between the Femto RBSs and the RNC is an Iub interface with extensions to carry additional information needed for a Femto RBS' and is called Iub+ interface in the FIG. 1, and is transported using an IP network providing IP connectivity between a Femto RBS and the RNC. In some scenarios the interface could be a standard Iub interface. As this IP network may consists of unprotected and uncontrollable IP networks, security mechanisms between the RNC and the Femto RBSs are typically included. Communication between the RNC 3 and the Macro RBS 4 is IP based or IP/ATM based, and the interface is Iub. The Macro RBS 4 is working as an access point for one or more wireless User Equipment 9 (UE) within a macro cell 7. The group of Femto RBSs (H3GAPs) 5 is working as access points for UEs within Femto cells 8. The RNC 3 may also communicate with a Femto RBS 6 via the Macro RBS 4. This way the Femto RBS uses the Macro RBS as an access point for wireless user equipments into the core network. The CN 2 might also be connected to two RNCs, a Macro 10 and a Femto RNC 11, dashed lines in the figure. These RNCs 10, 11 can be implemented in the same or separate physical RNC nodes. The Macro RNC 10 controls Macro Radio Base Stations, Macro RBSs, and the Femto RNC controls Femto RBSs, H3GAPs, marked with dashed lines. The Macro RNC and the Femto RNC would exchange information concerning access points, if necessary. An OSS 12 usually performs management of access points, Macro RBSs. A H3GAP manager 13 is responsible for managing H3GAPs. A H3GAP database 14 (H3GAP DB) is used to store information related to the Femto RBSs. A Security Gateway 15 might be connected between the RNC 3 and the Femto RBS group 5. The OSS, the H3GAP manager and the H3GAP DB can be standalone nodes or parts of other nodes like the RNC 3 or the CN 2. The OSS and the H3GAP manager might also be distributed programs in a network 1. An example of a Femto RBS implementation is disclosed by patent publication WO2007040454.

A Femto RBS is installed and managed by end users in a plug-and-play manner which creates special needs for such a system and giving operators restricted information and restricted access to Femto RBSs. Performing trace procedures in a network including these plug-and-play Femto cells and controlled or uncontrolled IP networks is not specified in any of the published 3GPP specifications. Femto solution based information is not specified nor is it defined how to retrieve this information in any existing systems or documentation.

SUMMARY

An object of the present invention is to introduce a procedure for performing tracing of wireless user equipment activity in networks comprising both Macro RBSs and Femto RBS and wherein plurality of the Femto RBSs are in connection with a network control node via one or more operator uncontrollable IP networks.

A further object of an embodiment of the present invention is to specify methods and procedures to obtain IP related information relating to user equipments located in Femto cells and to printout relevant information when requested.

In an embodiment of the present invention a method is described for controlling user equipment activity in a wireless communications network. The wireless communications network comprises operator controllable and/or operator uncontrollable access points. These access points are in communication with a network control node via one or more operator controllable and/or operator uncontrollable Internet Protocol, IP, networks. The described method is characterized by a step of receiving a trace triggering request and user equipment identification, at a network control node, from a first network node. Alternatively, the trace triggering request is received on a signaling connection that explicitly identifies the user equipment. The network control node then starts a trace recording and information retrieval procedure relating to the identified user equipment and identifies all used IP networks and user equipment serving access point. The method further comprises the steps of analyzing the IP networks used between the network node and the user equipment and/or analyzing the user equipment serving access point. Following, a trace printout is created including analyzing results and retrieved information, the printout is to be sent to a second network node, or stored locally for later retrieval.

In another embodiment of the present invention there is provided a network control node in use for controlling user equipment activity in a wireless communications network. The network control node is in contact with operator controllable and operator uncontrollable access points. The connection goes via one or more operator controllable and operator uncontrollable Internet Protocol, IP, networks. The network control node comprises a message transceiving unit that is used for receiving trace triggering requests and user equipment identifications. The network control node also comprises at race recording and information retrieval equipment that is used for identifying at least an IP network and an access point serving the identified user equipment. Analyzing equipment, in the network control node, is used for analyzing at least one IP network used by the user equipment and/or for analyzing the user equipment serving access point. The analyzing results and other retrieved information are sent in a trace printout as a response to the triggered request.

DETAILED DESCRIPTION

It will be understood by those skilled in the art that various modifications and changes may be made to the present invention without departure from the scope thereof, which is defined by the appended claims.

Trace procedures plays a major role in activities such as determination of: a root cause of a malfunctioning user equipment; advanced troubleshooting; optimisation of resource usage and quality; RF coverage control and capacity improvement; dropped call analysis; and, Core Network and UTRAN end to end 3G procedure validation.

Capability to log data on any interface at call level for a specific user (e.g. IMSI) or a user equipment type (e.g. IMEI or IMEISV) allows getting information which typically cannot be deduced from performance measurements such as: perception of end-user QoS during a call (e.g. requested QoS vs. provided QoS); correlation between protocol messages; RF measurements; or interoperability with specific user equipment vendors.

Main reasons are:
 IP related information is not specified in 3GPP specifications.
 Femto solution based information is not specified nor is it defined how such information should be retrieved.

Since the use of uncontrolled IP based access networks to provide wireless user equipment services is a fairly new concept and enhancements required to existing PLMN trace invocation procedures has not yet been specified. It is therefore an object of the present to give a solution to an enhanced trace invocation request.

An embodiment of the present invention is therefore to specify methods and procedures to obtain IP related information by investigating the IP transmission network(s) between a RNC and an identified Femto RBS (also called H3GAP or HAP).

In a further embodiment of the invention as additional steps to the method an investigation is performed in order to identify which local broadband operator is being used and/or which IP-address is being used.

In yet another aspect of an embodiment of the present invention a method is where an IP-address can be resolvable to a location (longitude/latitude) and which can be stored in a Home 3G Access Database (H3GAP) with other information, and which can also be retrieved upon request at any time after the activation of a Trace procedure.

Some of the statistics that can be stored and retrieved from a RNC, a SEGW, and a Femto RBS upon trace activation are: IP addresses; measured packet loss; measured packet round trip time; measured packet delay variations etc. The SEGW 15 usually provides: User authentication using Universal Subscriber Identity Module (USIM) information from a user equipment; IPsec tunneling and encryption between a user equipment and the SEGW; Firewall and distributed denial of service attack (DDoS) protection for core infrastructure; Traffic bandwidth limiting to prevent theft of service and DoS attacks on core infrastructure.

Figure 2:
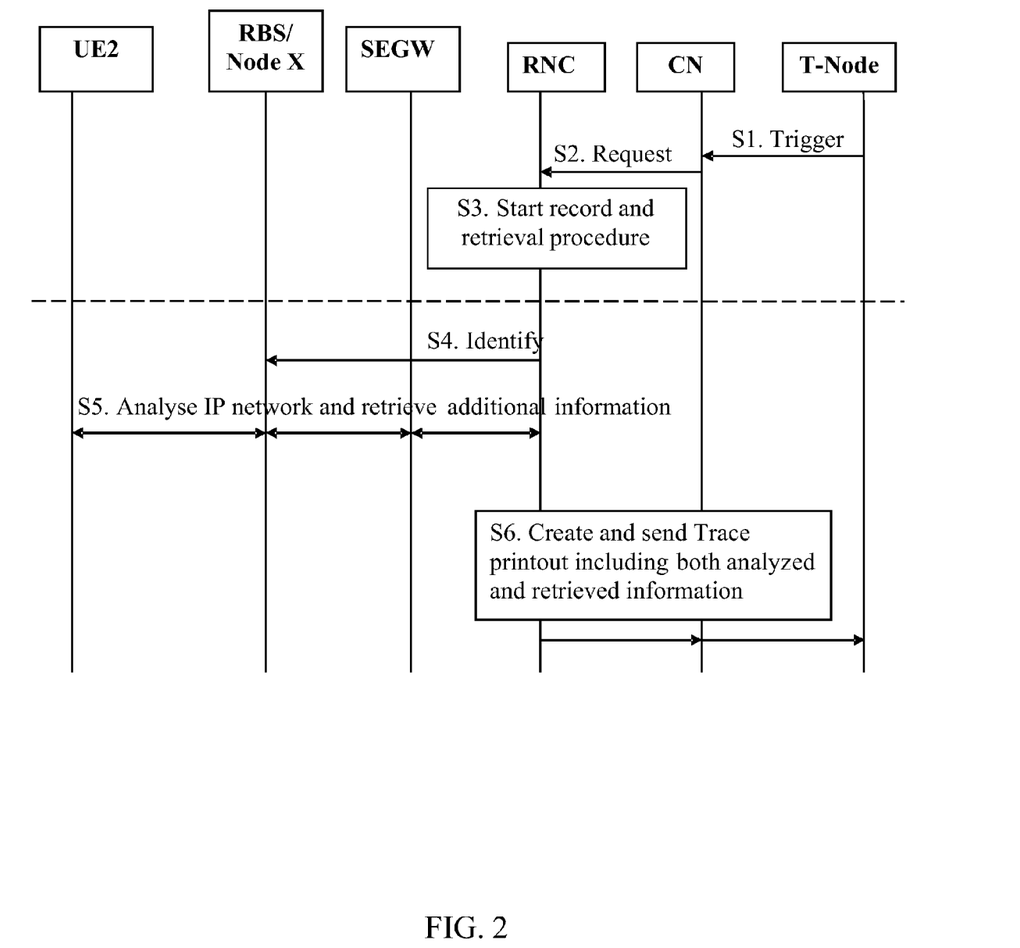
FIG. 2 is a signal diagram illustrating an embodiment of the present invention.

FIG. 2 is a signal diagram illustrating an embodiment of the present invention. As a non limiting example a WCDMA network is used and a description of a simplified implementation of the present invention. According to this non limiting example a triggering node detects or activates a triggering event starting a trace procedure. Typically the triggering node is one of the following: a person using the wireless equipment requesting information relating to him/her; an operator requesting information relating to user equipments; an authority requesting to trace a user of user equipment; or a time base activation. Still another possibility would be to perform the triggering based on traffical events e.g. for all calls that are disconnected abruptly and/or with a specific disconnect, reject or release cause. The triggering node (T-Node) informs a core network (CN) node (e.g. MSC, OSS, HLR, VLC, SGSN) that a trace is requested relating to a certain user equipment (step 1). The user equipment identification might be sent together with the request or the request may be sent on a signaling connection identifying explicitly the user equipment to be traced. The CN node initiates a trace procedure by sending the request, for example a RANAP "CN TRACE INVOKE" message, to a Radio Network Controller (RNC) (step 2). The trace invocation message is received in the RNC and the RNC starts a record and information retrieval procedure (step 3) regarding the identified user equipment. As a part of the procedure the RNC identifies used IP network(s) and user equipment serving access point (step 4). Existing tools in an IP domain can be used for step 4, e.g. the RNC initiates or asks a SEGW to initiate a so called trace route function for obtaining a list of all intermediate nodes used downlink. The trace route function may for example consist of sending of ICMP echo requests with increasing Time-To-Live (TTL) and analyzing the ICMP echo replies to obtain the intermediate nodes The RNC can also order the identified RBS ("user equipment access point") to initiate the trace route function so that paths used in both directions can be identified. In this later case, new messages could be used on the Iub interface or any other interface between the Femto RBS and the RNC or other controlling nodes (e.g. OSS). In case the RNC is ordering the SEGW to perform the trace route function towards the identified Femto RBS, new protocol and/or protocol messages need to be used on the interface between RNC and SEGW. The identified IP network that is used by the user equipment is thereafter analyzed (step 5). Typically this step is achieved by one or more of the following: activating and monitoring a trace route functions; measuring delays in the IP Network; sending and receiving one or more Internet Control Message Protocol, ICMP echo requests and replies, or so called "pings"; sending and receiving User Datagram Protocol, UDP, based error reporting messages; and performing access point status check. The UDP based error reporting would mean that test messages on UDP are already defined and should be used, giving a special advantage since normal traffic may also be transported using UDP and the UDP based error reporting messages would be handled with same procedures.

As an additional alternative to the invention, the analyzing step might also include:

requesting statistics and event log information from the identified access point and/or the SEGW (IP addresses, measured packet loss rate, measured packet round trip time; measured packet delay variations etc);

analyzing statistics related to the user equipment serving access point;

retrieving information relating to user equipment from a Home 3G Access Point data base (H3GAP DB) or information from other databases e.g. related to the IP network information;

requesting a security gateway, or a functional entity, to analyze one or more IP networks between the security gateway and the access point; and associating a location of the access point with the location of the user equipment and thereby possibly enabling tracking user equipment among other functions.

Thereafter, the RNC creates and sends (step 6) the analyzing results together with retrieved information, as a trace printout, to a second network node or back to the first network node or stores the information locally for later retrieval. The first node can be a core node (CN) triggering the request and the request could originally be coming from a service node e.g. an OSS node. If the trace information results are requested to be forwarded to an OSS, then this is performed.

In an embodiment of the present invention another implementation as the one mentioned above is also applicable for GSM based Femto RBS solutions and other IP based access network solutions, e.g. Abis/IP. In the GSM case a network control node is a Base Station controller (BSC) and core network interfaces are called A and Gb and the respective core network nodes are MSC and SGSN. A protocol used between the BSC and the MSC is called BSSMAP and a message used for tracing user equipment is called "MSC INVOKE TRACE". A protocol used between the BSC and the SGSN is called BSSGP and tracing messages used are called "SGSN-INVOKE-TRACE".

In yet another embodiment of implementation as the one mentioned above in relation to FIG. 2 the invention is also applicable for 3GPP Long term Evolution (LTE) and System Architecture Evolution (SAE) and would in that case mostly be used to trace and report information about IP networks between an Evolved NodeB (eNodeB) and an Access Gateway (AGW) or between an eNodeB and a Mobility Management Entity (MME).

Figure 3:
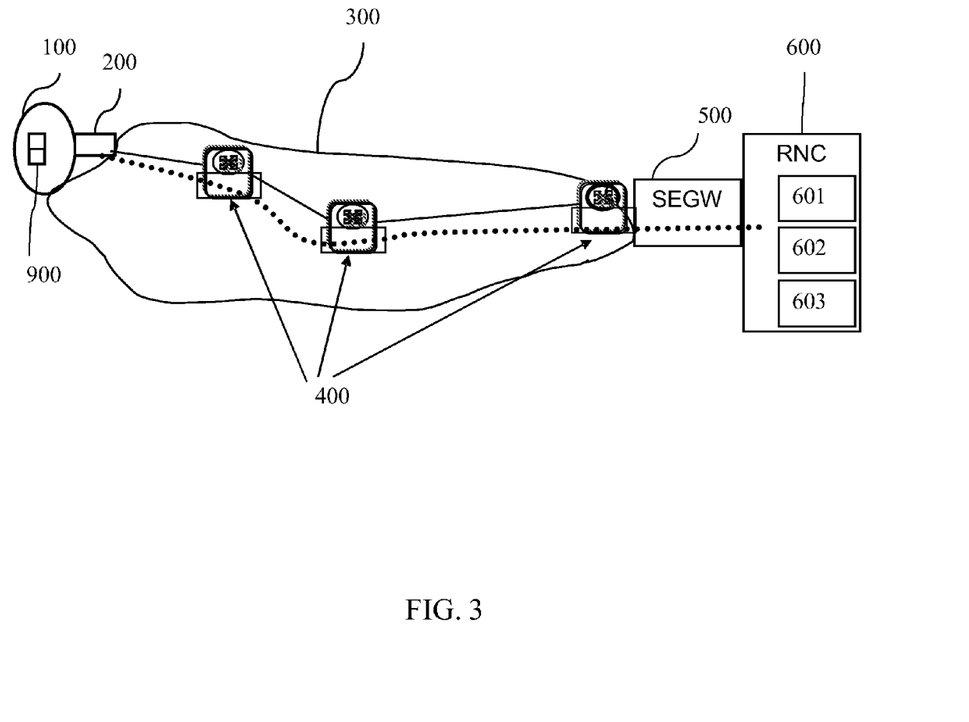
FIG. 3 illustrates an embodiment of the present invention comprising a Radio Network controller for performing analyses and retrieving relevant information upon a triggering event.

FIG. 3 illustrates an embodiment of the present invention comprising a Radio Network Controller for performing analyses and retrieving relevant information upon a triggering event. According to the figure a radio network controller is used for controlling user equipment activity in a wireless communications network 1. The network control node 600 is in contact with operator controllable 4 (FIG. 1) and at least one operator uncontrollable wireless access point 200 via one or more operator controllable and operator uncontrollable Internet Protocol, IP, networks 300. The network control node comprises a transceiver 601 that is used for receiving a trace triggering request, and user equipment identification, from at least a first network node. The user equipment 900 can be located in a Femto cell 100. The equipment identification (IMSI, MSISDN mapped to an IMSI, IMEI, and IMEISV etc.) is either included in the trace request or the trace request is sent separately on a signaling connection that explicitly identifies the user equipment. The IP network/s 300 includes one or more routers 400 handling traffic between an access point 200 and the RNC 600. A Security Gateway 500 (SEGW) can be used between the RNC 600 and the access point 200 and provides security over the IP network/s 300. The SEGW 500 usually provides: User authentication using Subscriber Identity Module (SIM) information from a user equipment; IPsec tunneling and encryption between a user equipment and the SEGW; Firewall and distributed denial of service attack (DDoS) protection for core infrastructure; Traffic bandwidth limiting to prevent theft of service and DoS attacks on core infrastructure; and Quality of Service (QoS) to ensure a proper prioritization of traffic into a core network. The RNC further comprises Trace recording and information retrieval equipment 602 that is used to identify at least an IP network 300 and an access point 200 serving the identified user equipment 900. The RNC also comprises analyzing equipment 603 used to analyze at least one IP network 300 that is used by the user equipment 900. The analyzing equipment 603 is also able to analyze the user equipment serving access point 200 serving a user equipment 900 in a Femto cell 100. The analyzing results are finally included in a trace printout together with other retrieved information and sent to a requesting node or to some other predetermined node In addition, the present invention and its embodiments can be realized in many ways. For example, one embodiment of the present invention includes a computer-readable medium having instructions stored thereon that are executable by a computer system for performing a procedure of controlling user equipment activity in a wireless communications network. Other examples are configuration upgrade disk(s), distributed program or downloadable upgrade program that might be used. The instructions executable by the computing system and stored on the computer-readable medium perform the method steps of the present invention as set forth in the claims.

The invention is not limited to the examples of embodiments described above and shown in the drawings, but may be varied freely within the scope of the appended claims. For example, as has also been pointed out elsewhere in this text, the invention may be applied in a variety of systems which utilize the principle of information reporting between two nodes in the system.

What is claimed is:

1. A method for controlling user equipment activity in a wireless communications network, the wireless communications network having operator controllable access points and operator uncontrollable access points that are in communication with a network control node via one or more operator controllable and/or operator uncontrollable Internet Protocol (IP) networks, the method comprising the steps of:
   receiving a trace triggering request and user equipment identification at the network control node from a first network node;
   starting, at the network control node, a trace recording and information retrieval procedure relating to the identified user equipment;
   identifying, at the network control node, all used IP networks and the access point serving the user equipment;
   analyzing the IP networks used between the network control node and the user equipment and analyzing the access point serving the user equipment; and
   including analyzing results in a trace printout together with retrieved information to be sent to a second network node, wherein the analyzing further comprises at least one of the steps of:
      activating and monitoring a trace route function,
      measuring delays in an IP Network,
      sending and monitoring one or more Internet Control Message Protocol (ICMP) echo requests, or pings,
      sending User Datagram Protocol (UDP) based error reporting messages,
      performing access point status check,
      retrieving statistics and other information relating to at least one of: IP Addresses, loss probability, loss rate, delays and delay variations,
      requesting event log information relating to identified access point, and
      requesting a security gateway, or a functional entity to analyze one or more IP networks between the security gateway and the access point.

2. The method of claim 1 wherein the controllable access points are at least one of a macro radio base station (RBS), micro RBS, and pico RBS; and the uncontrollable access point is a femto RBS.

3. The method of claim 1, wherein the trace request is triggered by an end user or a network node for at least one of: trouble shooting, optimizing a fault localization procedure, and user equipment localization.

4. The method of claim 1, wherein the trace recording and information retrieval procedure further comprises the step of identifying an IP address of a user equipment serving access point and mapping the IP address to a pre-stored location.

5. The method of claim 2, wherein the trace recording and information retrieval procedure performed by the network control node involves retrieving stored information from a Home 3G Access Point (H3GAP) database relating to a used IP network and/or femto RBS.

6. The method of claim 1, wherein the first network node and the second network node are either a same node or any combination of the following nodes: an operation and maintenance center, a mobile switching center, a home location register (HLR), a visiting location register (VLR), a radio base station (RBS), a security gateway (SEGW) and a serving GPRS support node (SGSN).

7. The method of claim 1, wherein the user equipment identification is included in the trace request or sent separately as a request on a signaling connection.

8. A network control node for controlling user equipment activity in a wireless communications network, the network control node being in communication with operator controllable access points and operator uncontrollable access points via one or more operator controllable and operator uncontrollable Internet Protocol (IP) networks, the network control node comprising a transceiver used for receiving trace triggering requests and user equipment identifications, the network control node comprising:
   trace recording and information retrieval equipment in use for identifying at least an IP network and an access point serving the identified user equipment; and
   analyzing equipment in use for analyzing at least one IP network used by the user equipment and for analyzing the access point serving the user equipment and for including the analyzing results in a trace printout together with other retrieved information to be sent in response to the triggered request, wherein the analyzing equipment is further configured for requesting a security gateway, or a functional entity, to analyze one or more IP networks between the security gateway and the access point, wherein the analyzing equipment is responsible for performing at least one of the following activities: activating and monitoring a trace route functions; measuring delays in an IP Network; sending and monitoring one or more Internet Control Message Protocol (ICMP), echo requests, or pings; sending User Datagram Protocol (UDP), based error reporting messages; performing access point status check; retrieving statistics and other information relating to one or more of the following: addresses, loss probability, loss rate, delays and delay variations; requesting event log information relating to identified access point and requesting a security gateway, or a functional entity, to analyze one or more IP networks between the security gateway and the access point.

9. The network control node of claim 8, wherein such network control node is in communication with at least one of the following controllable access points: macro radio base station (RBS), micro RBS, and pico RBS;
   and a femto RBS.

10. The network control node of any of claims 8, wherein the user equipment identification is included in the trace request or sent separately as a request on a signaling connection.

11. The network control node of claim 8, wherein the trace recording and information retrieval procedure involves the step of identifying an IP address of a user equipment serving access point and mapping the IP address to a pre-stored location.

12. The network control node of claim 9, wherein the trace recording and information retrieval procedure involves retrieving stored information from a Home 3G Access Point (H3GAP) database, relating to user IP networks and/or femto RBS.

13. The method of claim 1, wherein the step of analyzing further comprises at least one of:
   requesting statistics and event log information from an identified access point and/or the security gateway, wherein the statistics and event log information includes IP addresses, measured packet loss rate, measure packet round trip time, and measured packet delay variations;
   analyzing statistics related to a user equipment serving access point;
   retrieving information related to a user equipment from a Home 3G Access Point database (H3GAP DB);
   requesting a security gateway, or a functional entity, to analyze one or more IP networks between the security gateway and the access point; and
   associating a location of the access point with the location of the user equipment and thereby enabling tracking user equipment among other functions.

14. The method of claim 1, wherein the IP address is resolvable to a location, stored in a Home 3G Access Database (H3GAP) with other information, and retrievable upon request after an activation of a trace procedure.

15. The method of claim 1, wherein the network control node is a radio network controller (RNC).

16. The method of claim 1, wherein the network control node is located outside of the core network and the first network node is located within the core network.

* * * * *

UNITED STATES PATENT AND TRADEMARK OFFICE
CERTIFICATE OF CORRECTION

PATENT NO. : 8,879,406 B2  
APPLICATION NO. : 12/600849  
DATED : November 4, 2014  
INVENTOR(S) : Nylander et al.

Page 1 of 1

It is certified that error appears in the above-identified patent and that said Letters Patent is hereby corrected as shown below:

In the Specification

In Column 1, Line 56, delete "are a".

In Column 4, Line 49, delete "Home 3G Access Database (H3GAP)" and insert -- Home 3G Access Point Database (H3GAP DB) --, therefor.

In the Claims

In Column 10, Lines 12-13, in Claim 14, delete "Home 3G Access Database (H3GAP)" and insert -- Home 3G Access Point Database (H3GAP DB) --, therefor.

Signed and Sealed this  
Twelfth Day of May, 2015

Michelle K. Lee  
*Director of the United States Patent and Trademark Office*